United States Patent

McGuirk, Jr.

[15] 3,649,849

[45] Mar. 14, 1972

[54] TRIGGERING CIRCUITS FOR GATE-CONTROLLED FULL-WAVE ALTERNATING CURRENT SEMICONDUCTOR SWITCHES

[72] Inventor: Francis A. McGuirk, Jr., Chatham, N.J.

[73] Assignee: Wagner Electric Corporation

[22] Filed: Sept. 18, 1970

[21] Appl. No.: 73,369

[52] U.S. Cl. ..................307/252 VA, 307/252 B, 323/22 SC

[51] Int. Cl. ........................................................H03k 17/00

[58] Field of Search ....................307/252 B, 252 N, 252 VA; 323/22, 24, 38

[56] References Cited

UNITED STATES PATENTS 3,506,852 4/1970 De Hart..............................307/252 B 3,335,291 8/1967 Gutzwiller...........................307/252 B 3,381,226 4/1968 Jones et al...........................307/252 B

*Primary Examiner*—John Zazworsky

*Attorney*—Eyre, Mann & Lucas

[57] ABSTRACT

Trigger circuits for rendering conductive a gate-controlled full-wave alternating current semiconductor switch (thyristor) by generating triggering pulses which are synchronized with the alternating current voltage applied to the main terminals of said switch so that said triggering pulses are provided to the gate of the switch as said alternating current voltage wave passes through the null point.

6 Claims, 4 Drawing Figures

INVENTOR
FRANCIS A. McGUIRK, JR.
BY
Eyre, Mann & Lucas
ATTORNEYS

INVENTOR
FRANCIS A. McGUIRK, JR.
BY
Eyre, Mann & Lucas
ATTORNEYS

TRIGGERING CIRCUITS FOR GATE-CONTROLLED FULL-WAVE ALTERNATING CURRENT SEMICONDUCTOR SWITCHES

The present invention relates to circuits for triggering gate-controlled, full-wave alternating current semiconductor switches, i.e., thyristors. Specifically, the disclosed triggering circuits are designed to provide trigger pulses to the gate electrode of the thyristor in synchronization with the applied alternating current voltage wave. The first preferred embodiment of the present invention provides triggering pulses each time the applied alternating current voltage wave passes through a null or zero voltage point, and this phase relationship of pulse to alternating current voltage wave is not variable. The second preferred embodiment of the present invention provides triggering pulses which have a variable phase relationship with the applied alternating current voltage wave.

Thyristors are designed to switch from a blocking state to a conducting state for either polarity of applied voltage with either positive or negative gate triggering. Such devices must be switched during each half cycle of the applied alternating current voltage wave. If the triggering pulses are sufficiently large, they will effect switching regardless of their polarity. It is a further characteristic of thyristors that the minimum magnitude of the triggering pulses increases as voltage across the main terminals decreases.

The method of triggering performed by the disclosed circuits embodying the present invention affords several advantages. Although the magnitude of the triggering pulses must be larger than would be necessary if triggering were to occur when there is a substantial voltage across the main terminals of the thyristor, and must also be large enough to effect switching when the alternating current voltage wave is entering a half-cycle of opposite polarity, a thyristor may nevertheless be controlled by relatively high-voltage trigger pulses of very brief duration. Power dissipation in the gate circuit of the thyristor is thus minimized by limiting the duration of the triggering pulses. In addition, the radio frequency interference generated by triggering a thyristor at a non-null point of the applied alternating current voltage wave is eliminated.

A better understanding of the present invention may be had by reference to the accompanying drawings, of which:

Figure 1:
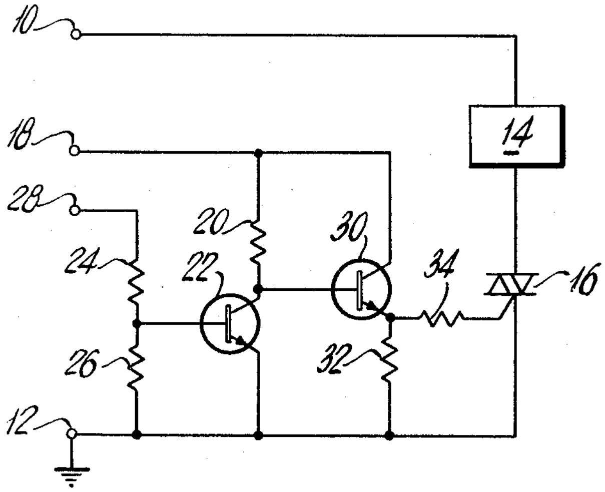
FIG. 1 is a schematic drawing of a first preferred circuit embodying the present invention.

Referring now specifically to FIG. 1, terminals 10 and 12 have the load 14 and the main terminals of thyristor 16 connected in series therebetween. Terminal 12 may be grounded as shown. A suitable DC voltage of about 10–15 volts, which may be conventionally derived from the applied AC voltage by means of rectifying and filtering circuitry, is applied to terminal 18, thus energizing the amplifier circuit whose first stage comprises resistor 20 and NPN-type transistor 22, which is connected in the common-emitter configuration between terminals 18 and 12. The base of transistor 22 is connected to the junction of input circuit resistors 24 and 26, which are connected in series between terminals 28 and 12 to form a voltage divider. Transistor 30 and resistor 32 form a second-stage emitter-follower amplifier circuit, with the collector of transistor 30 connected to terminal 18 and optional resistor 32 connected between the emitter of transistor 30 and terminal 12. The base of transistor 30 is connected to the junction of resistor 20 and the collector of transistor 22. Resistor 34 is connected between the emitter of transistor 30 and the gate electrode of switching device 16.

Figure 2:
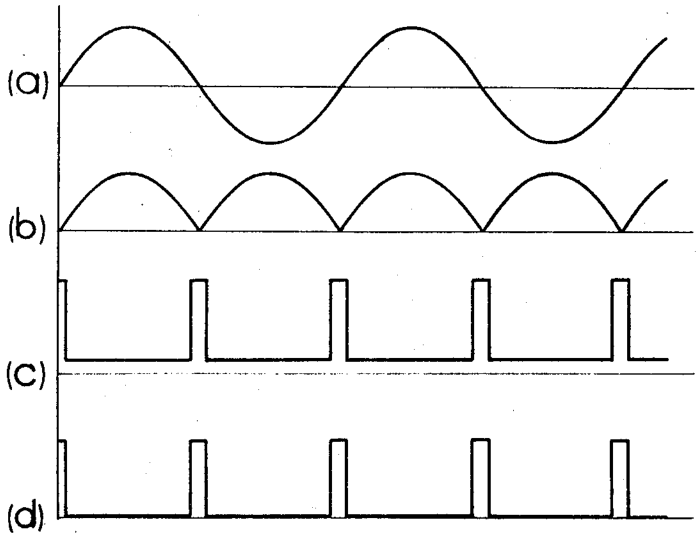
FIG. 2 illustrates the voltage waveforms at various points in the circuit shown in FIG. 1 and shows their phase relationships.

The operation of the circuit shown in FIG. 1 is as follows:

When a standard (115–120 v., 60 Hz.) AC voltage having the conventional sinusoidal waveform as shown in FIG. 2(*a*) is applied to terminal 10, 10–15 volts DC is applied to terminal 18, and the full-wave rectified voltage shown in FIG. 2(*b*), derivable from the applied AC voltage by conventional means such as a diode bridge, is applied to terminal 28, transistor 22 will be rendered conductive whenever the latter waveform is slightly greater than zero. When conductive, transistor 22 will permit current to flow through resistor 20, thus placing the collector of transistor 22 nearly at ground potential. This in turn causes transistor 30 to become non-conductive. Thus, the input to the base of transistor 30 will be a series of short-duration pulses occurring at the null points of the full-wave rectified voltage wave, as shown in FIG. 2(*c*). The output of the emitter-follower amplifier circuit comprising transistor 30 and resistor 32 will be as shown in FIG. 2(*d*), i.e., short-duration pulses occurring at the null point of the controlled alternating current power wave. Thus, the desired phase relationship is achieved between the triggering output pulses of the control circuit applied to the gate electrode of thyristor 16 and the AC voltage wave applied across the main terminals of thyristor 16.

Figure 3:
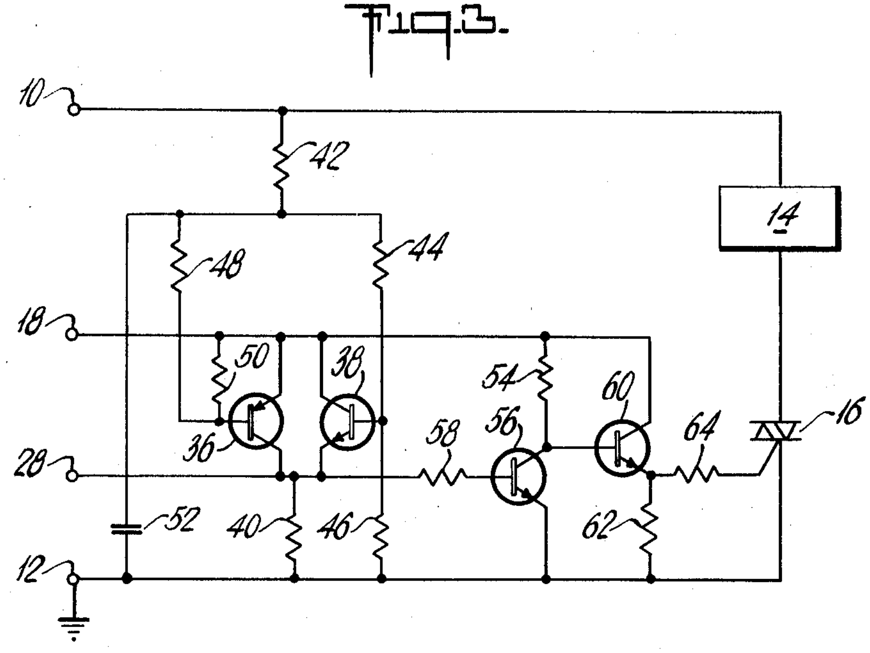
FIG. 3 is a schematic drawing of a second preferred circuit embodying the present invention.

Referring now to the embodiment shown in FIG. 3, this circuit performs the same function as the circuit shown in FIG. 1, but includes phase-shifting circuitry operative to vary the phase angle between the occurrence of triggering pulses and the null points of the applied AC voltage wave. In this embodiment, each of the transistors of the complementary transistor pair 36, 38 has its emitter connected to the collector of the other transistor, with the emitter of transistor 36 being connected to DC power input terminal 18. The collector of transistor 36 and the emitter of transistor 38 are both connected to control terminal 28 and to the high side of resistor 40. The low side of resistor 40 is connected to terminal 12, which may be grounded as shown. A phase-shifting network comprising series-connected resistor 42 and capacitor 52 is connected between terminals 10 and 12. Resistors 44 and 46 are connected in series from the junction of resistor 42 and capacitor 52 to terminal 12, with the base of transistor 38 being connected to the junction of the voltage divider formed by resistors 44 and 46. Resistors 48 and 50 are connected from the junction of resistor 42 and capacitor 52 to terminal 18, with the base of transistor 36 being connected to the junction of the voltage divider formed by resistors 48 and 50.

A first-stage transistor amplifier circuit comprising resistor 54 is connected from terminal 18 to the collector of transistor 56, the emitter being connected to terminal 12. The base of transistor 56 is connected to the high side of resistor 40 by a resistor 58.

A second-stage emitter-follower transistor amplifier circuit controls the switching device 16, this amplifier comprising transistor 60 having its collector connected to terminal 18, with optional resistor 62 connected between the emitter of transistor 60 and terminal 12. The base of transistor 60 is connected to the collector of transistor 56. The emitter of transistor 60 is also connected to the gate electrode of switching device 16 by resistor 64.

Figure 4:
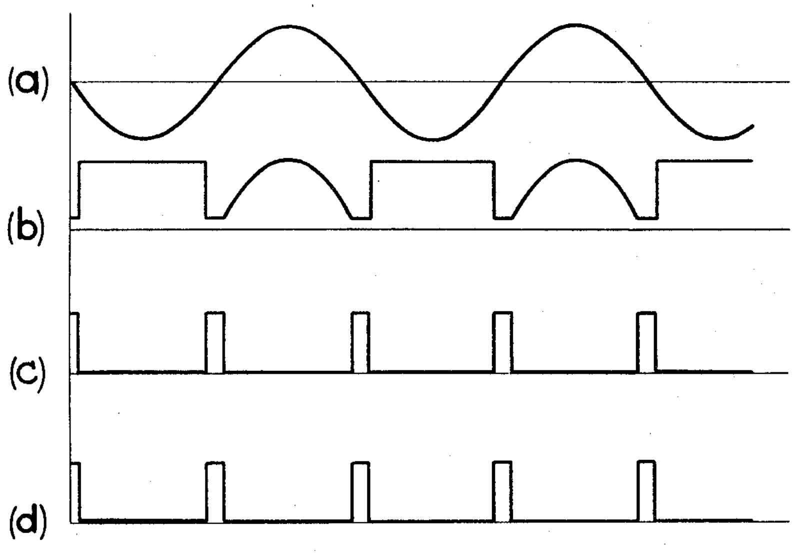
FIG. 4 illustrates the voltage waveforms at various points in the circuit shown in FIG. 3 and shows their phase relationships.

The operation of the circuit shown in FIG. 3 is as follows:

When a standard (115–120 v., 60 hertz) alternating current voltage wave as shown in FIG. 4(*a*) is applied to terminal 10, 10–15 volts DC is applied to terminal 18, and a DC null control signal is applied to terminal 28, transistor 38 will become conductive whenever the applied AC voltage wave is positive by a value determined by the voltage divider comprising resistances 44 and 46. Consequently, a voltage will be developed across resistance 40 during a predetermined period slightly shorter than the period during which the applied alternating current voltage wave is positive. When the applied AC voltage wave is negative by a value determined by the voltage divider comprising resistances 48 and 50, transistor 36 will conduct. Consequently, a voltage will be developed across resistance 40 for a period of time slightly shorter than the period during which the applied alternating current voltage wave is negative. The unipolar voltage wave thus developed across resistor 40 is shown in FIG. 4(*b*). Transistor 36 will not conduct when the applied voltage is positive, and transistor 38 will not conduct when the applied voltage is negative. There will be a short period of time on either side of the null or zero voltage points of the applied AC voltage wave when there is almost no voltage developed across resistance 40. During this time, transistor 56 will be non-conductive, thereby causing a series of voltage pulses as shown in FIG. 4(*c*) to appear at its collector. These pulses are applied to the base of transistor 60, which in turn develops a series of voltage pulses as shown in FIG. 4(*d*) at its emitter. These pulses are applied to the gate terminal of thyristor 16 through resistance 64, which limits the flow of current in the gate circuit of thyristor 16. The period of time during which a voltage is developed across resistance 62, i.e., the duration of the pulses, is quite brief in comparison with the period of the applied AC voltage. Generation of these triggering pulses may be inhibited by placing terminal 28 at a positive DC voltage sufficient to maintain transistor 46 conductive, which in turn causes transistor 60 to remain non-conductive.

The triggering pulses which are thus generated and applied to the gate circuit of thyristor 16 are synchronized with the applied AC voltage. These pulses may be made to occur as the applied AC voltage passes through its null or zero voltage point, or they can be varied in their phase relationship with the applied AC voltage wave by varying the time constant of resistance 42 and capacitance 52. In the circuit operation described above, the triggering pulses will occur after the applied AC voltage wave passes through a null or zero voltage point because the two voltage dividers comprising resistances 44, 46 and 48, 50, respectively, are energized by a voltage wave which lays the applied AC voltage wave. The opposite result may be secured by replacing capacitor 52 with an inductor, which will cause the voltage derived at the junction of the two elements of the phaseshifting circuit to lead the applied AC voltage impressed between terminals 10 and 12. In FIG. 4, the various waveforms are shown for the circuit of FIG. 3 in which no phase-shifting is effected; capacitor 52 is effectively removed from the circuit. Consequently, the triggering pulses occur at the null or zero voltage of the applied AC voltage wave.

In the first preferred embodiment shown in FIG. 1, the values of the various circuit elements are as follows:

| Resistances | Transistors |
|---|---|
| 20 - 10K ohms | 22 - 2N3567 |
| 24 - 10K ohms | 30 - 2N3567 |
| 26 - 1K ohms | |
| 32 - 1K ohms | Thyristor |
| 34 - 100 ohms | 16 - 40475 |

In the second preferred embodiment shown in FIG. 3, the values of the various circuit elements are as follows:

| Resistances | Capacitor |
|---|---|
| 40 - 47K ohms | 52 - .01 microfarads |
| 42 - 47K ohms | |
| 44 - 100K ohms | Transistors |
| 46 - 18K ohms | 36 - 2N4248 |
| 48 - 100K ohms | 38 - 2N3567 |
| 50 - 3.3K ohms | 56 - 2N3567 |
| 54 - 10K ohms | 60 - 2N3567 |
| 58 - 10K ohms | |
| 62 - 1K ohms | Thyristor |
| 64 - 100 ohms | 16 - 40475 |

These circuits have utility as a solid-state replacement for an electromechanical switching circuit, over which they have numerous advantages. For example, these solid-state circuits have no problems of mechanical wear or adjustment, and thus afford a longer operating life and greater stability. These particular circuits have found application in capacitance-responsive control circuits which have been utilized to control devices such as hand dryers which provide a stream of hot air.

Such capacitance-responsive control circuits can be actuated by spurious signals such as radio frequency interference or line transients. Since the disclosed circuits eliminate such interference and transients, they are particularly well adapted for use with such capacitance-responsive control circuits.

The advantages of the present invention, as well as certain changes and modifications of the disclosed embodiments thereof, will be readily apparent to those skilled in the art. It is the applicant's intention to cover all those changes and modifications which could be made to the embodiments of the invention herein chosen for the purposes of the disclosure without departing from the spirit and scope of the invention.

What is claimed is:

1. A pulse-generating circuit for triggering full-wave alternating current semiconductor switch having a controlling gate terminal and first and second main terminals, said pulse-generating circuit comprising:

1. input circuit means comprising a voltage divider formed by first and second series-connected resistances; and
2. amplifier means comprising a first-stage transistor having a collector connected to a base of a second-stage transistor having an emitter-follower impedance, and having an input terminal connected to the junction of said first and second resistances, and having an output terminal connected through a third resistance to the gate terminal of the semiconductor switch said amplifier means being operative to generate trigger pulses at said output terminal in synchronization with the alternating-current voltage across a load circuit including said first and second main terminals of said switch when a predetermined input signal comprising a full-wave rectified voltage in synchronization with the alternating-current voltage across the load circuit is applied to said input circuit means.

2. A pulse-generating circuit for triggering full-wave alternating current semiconductor switch having controlling gate terminal and first and second main terminals, said pulse-generating circuit comprising:

1. first circuit means operative in response to a predetermined input signal to generate an intermediate signal, and comprising first and second switching means, each operative to generate a portion of said intermediate signal in response to first and second input signal components, of opposite polarities; and
2. second circuit means operative in response to said intermediate signal from said first circuit means to generate a series of output pulses in synchronization with the alternating-current voltage applied to a load circuit having the first and second main terminals of the semiconductor switch connected therein.

3. The pulse-generating circuit according to claim 2 wherein said first circuit means further comprises phase-shifting circuit means operative to vary the phase relationship of each output pulse with respect to the alternating-current voltage wave applied to the load circuit having the first and second main terminals of the semiconductor switch connected therein.

4. The pulse-generating circuit according to claim 2 wherein said first and second switching means have a common output resistance, the high side of which is connected to a control terminal to which said predetermined input signal is applied.

5. The pulse-generating circuit according to claim 2 wherein said predetermined input signal is a substantially null direct-current voltage.

6. The pulse-generating circuit according to claim 2 wherein said second circuit means comprises a first-stage transistor having its collector connected to the base of a second-stage transistor having an emitter - follower impedance.

* * * * *